H. J. GEHR.
FRUIT AND VEGETABLE GRADER.
APPLICATION FILED OCT. 2, 1915.
1,178,006.
Patented Apr. 4, 1916.
2 SHEETS—SHEET 1.
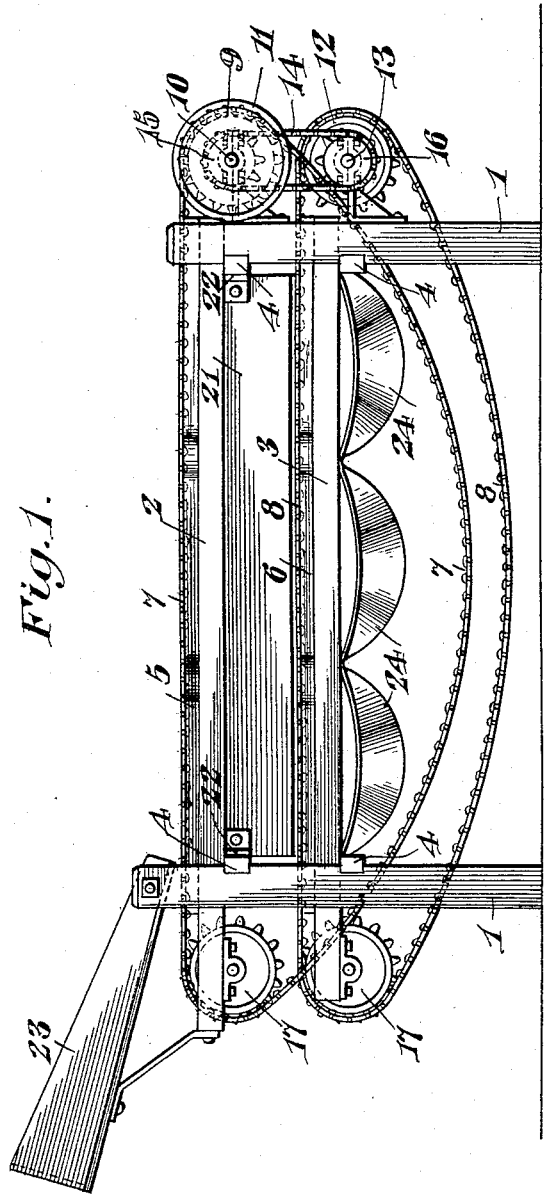
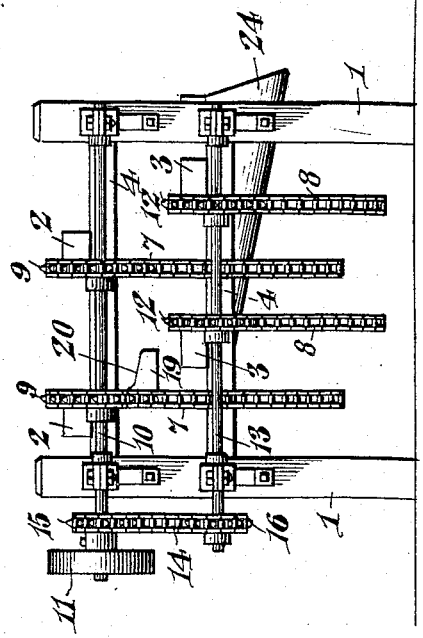
WITNESSES:
Jas. K. M$^c$Cathran
H. T. Chapman
*Harvey J. Gehr*, INVENTOR
BY C. G. Siggers
Attorney H. J. GEHR.
FRUIT AND VEGETABLE GRADER.
APPLICATION FILED OCT. 2, 1915.
1,178,006.
Patented Apr. 4, 1916.
2 SHEETS—SHEET 2.
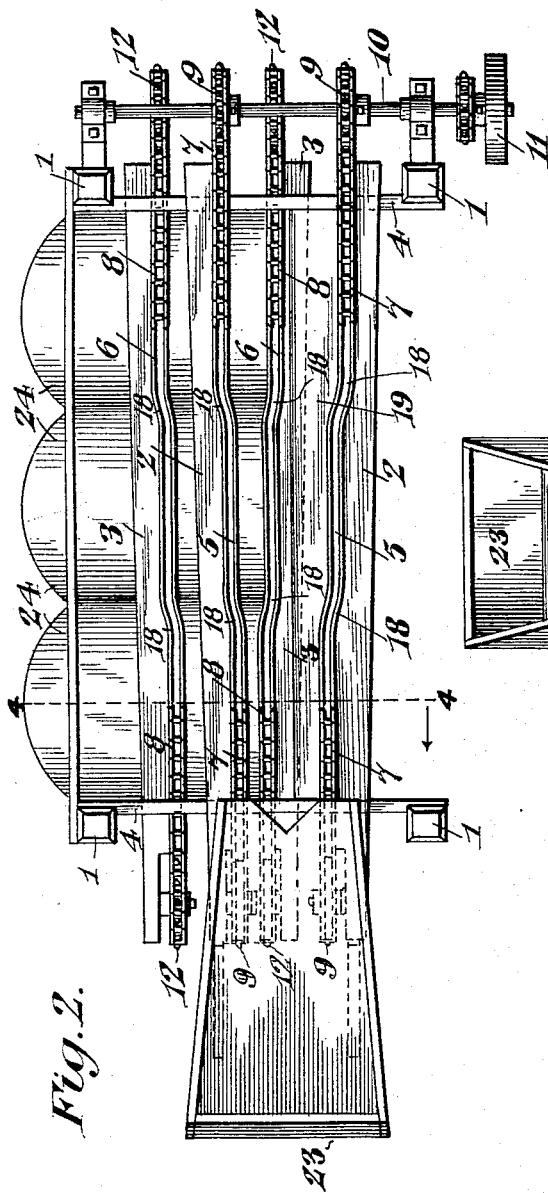
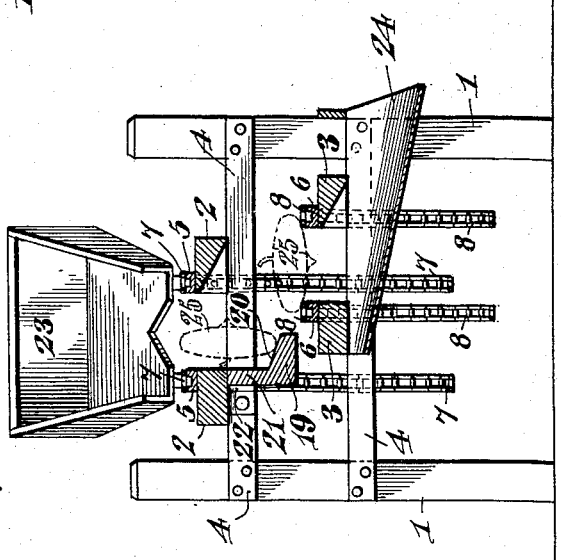
WITNESSES:
Jas. K. McCathran
F. T. Chapman
Harvey J. Gehr, INVENTOR
BY
Attorney

UNITED STATES PATENT OFFICE.

HARVEY JOHN GEHR, OF WAYNESBORO, PENNSYLVANIA.

FRUIT AND VEGETABLE GRADER.

1,178,006.  Specification of Letters Patent.  Patented Apr. 4, 1916.

Application filed October 2, 1915. Serial No. 53,798.

*To all whom it may concern:*

Be it known that I, HARVEY J. GEHR, a citizen of the United States, residing at Waynesboro, in the county of Franklin and State of Pennsylvania, have invented a new and useful Fruit and Vegetable Grader, of which the following is a specification.

This invention has reference to fruit and vegetable graders and its object is to provide a grader for articles of oval or other shapes in which there is a longer and a shorter diameter, the grading depending upon the longer diameter.

In accordance with the present invention, the fruit or vegetable is received upon a grading conveyer having spaced members in diverging relation in the direction of travel and so arranged with relation to the fruit or vegetable to be graded that such fruit or vegetable is supported along its longer diameter, but will fall through the conveyer at any point, if presented thereto along the shorter diameter. Under-riding the first named conveyer is another conveyer substantially identical with the first conveyer, but displaced laterally with respect to the line of travel of the first conveyer while between the two conveyers there is provided an upsetting structure whereby the fruit or vegetable falling upon the upsetting structure in line with the longer diameter will move laterally through a sufficient arc to deposit the fruit or vegetable upon the second conveyer so as to be carried by the second conveyer to a point where the sustaining members of the second conveyer are spaced apart a greater distance than the longer diameter of the fruit or vegetable. Should a fruit or vegetable properly deposited on the first or higher conveyer reach the point where it will fall through the conveyer, the upsetting structure will cause such fruit or vegetable to be presented to the second conveyer in the direction of a shorter diameter, wherefore it will simply fall on through the second conveyer to a diverting chute provided for the purpose of delivering the graded or sorted fruit or vegetable into the proper receptacle.

The invention will be best understood from a consideration of the following detailed description, taken in connection with the accompanying drawings forming part of this specification with the further understanding that while the drawings show a practical form of the invention, the latter is not confined to any strict conformity with the showing of the drawings, but may be changed and modified so long as such changes and modifications come within the scope of the appended claims.

In the drawings: Figure 1 is a side elevation of a grader embodying the invention. Fig. 2 is a plan view thereof. Fig. 3 is an end view as seen from the right hand end of Fig. 1. Fig. 4 is a section on the line 4—4 of Fig. 2.

The drawings are not intended to show in detail all the parts of the grader since some features are more or less schematically shown.

In the showing of the drawings there is a frame composed of uprights constituting legs 1, with longitudinal beams 2, 3 respectively, and cross beams 4 connecting the legs and forming the main frame of the machine.

The longitudinal beams 2 may be arranged divergently with respect to their length and are located at a relatively high point in the frame. The longitudinal beams 3 have a similar longitudinal divergent relation and are located at a lower point in the frame in laterally displaced relation to the longitudinal center line of the pair of beams 2. Mounted on each beam 2 is a track 5 and on each beam 3 is a track 6. The tracks 5 each carry a sprocket chain 7, while the tracks 6 each carry a sprocket chain 8. The sprocket chains 7 are engaged by sprocket wheels 9 on a shaft 10 journaled in the main frame and in the particular showing of the drawings constituting the drive shaft of the machine. A pulley 11 fast on the shaft 10 may represent the driving means for the shaft. The chains 8 extend about sprocket wheels 12 on a counter shaft 13 journaled in the main frame below the shaft 10 and receiving power from the shaft 10 by means of a sprocket chain 14 carried about sprocket wheels 15 and 16 on the respective shafts 10 and 13. The sprocket wheels 9 and 12 are arranged at one end of the machine while at the other end are idler sprocket wheels 17 for the respective chains 7 and 8. The tracks 5 and 6 diverge similarly to the beams carrying them but the divergence may be arranged in steps so that portions of the brackets are parallel and other portions indicated at 18 have a greater divergence than the beams carrying them.

In the particular showing of the drawings the lower conveyer represented by the chains 8 is displaced to one side of the longitudinal center line of the upper conveyer. Between the two conveyers there is arranged a deflecting strip 19 with a beveled upper surface 20, the strip being provided with a sustaining member 21 made fast to any suitable part of the frame, as by brackets 22 secured to the cross beams 4.

The deflecting strip 19 is so disposed with relation to the upper conveyer tracks 5 that the fruit or vegetable dropping from such tracks will strike the deflecting strip 19 on its beveled edge 20 and be constrained thereby to move from the position in which it strikes the deflecting strip to another position substantially perpendicular to the first position. Moreover the deflecting strip in thus tending to upset the fruit or vegetable striking it will cause a side divergence of the fruit or vegetable from the grading path to a position wherein it will either rest on or pass through the second grading conveyer located at a lower level than the first one.

In the operation of the machine, the fruits or vegetables are placed in a hopper 23 in line with the upper grading conveyer and may gravitate from the hopper to the conveyer. The passage of the vegetables from the hopper to the conveyer may be without other guidance than that afforded by the hopper itself, or the individual fruit or vegetable may be placed by hand upon the receiving end of the higher grading conveyer. If it be assumed that a turnip, for instance, is placed upon the upper conveyer with its longer diameter parallel with the plane of the conveyer, then it is carried along by the conveyer, and the widening of the higher conveyer is sufficient to permit the vegetable to drop through. This results in one end of the vegetable striking the deflecting or upsetting strip 19 whereupon the other end of the vegetable being unsupported continues to move, until at some point near its middle it strikes the near side of the under conveyer, and the momentum of the vegetable will cause it to topple over the near edge of the under conveyer so that the longer diameter of the vegetable is then upright. It continues to gravitate through the second conveyer without being carried along by the latter and ultimately drops into and appropriates chute 24 by means of which the vegetable reaching the chute is directed to a suitable point of disposal or into a suitable receptacle as is customary in grading machines. Suppose, however, that a vegetable such as indicated in dotted lines at 25 in Fig. 4 approaches the higher conveyer edge on, that is in the direction of its longer diameter, so that the shorter diameter of the vegetable is cross-wise of the conveyer. Under these circumstances, the vegetable gravitates edge on through the higher conveyer until one edge of the vegetable engages the beveled edge 20 of the deflector or upsetting strip 19. The bevel shape of the surface engaged by the edge of the vegetable 25 together with the momentum of said vegetable causes it to tip over toward the lower conveyer in a manner to become deposited upon the lower conveyer with the longer diameter of the vegetable parallel with the plane of the lower conveyer. Now the vegetable is carried along in the direction of travel of the conveyer until ultimately a sufficiently wide portion of the conveyer is reached to permit the vegetable to drop through the conveyer into an appropriate one of the chutes 24. In Fig. 4 the different positions of the vegetable 25 are indicated in dotted lines.

By the present invention two practically identical conveyers are provided and are located one below the other but with the lower one displaced laterally with respect to the higher one, while between the two conveyers a deflecting and upsetting means represented by the strip 19 is provided. By such a structure, a vegetable, in the event of being properly located upon the upper conveyer is carried along thereby until it finally reaches a suitable spread apart portion of the conveyer and the vegetable then being released drops from the conveyer in the usual manner. However, instead of falling at once into a chute or other directing means, the properly graded vegetable drops upon a side-wise diverting structure so arranged as to cause the upsetting of the vegetable to an extent to impart to it a movement of about a quarter turn or more and the graded vegetable is not only laterally diverted and upset but is directed to the second lower and laterally displaced conveyer. This, however, does not stop the progress of the properly graded vegetable to the chute or similar means of disposal of the vegetable, but permits it to then find its way without further grading action to said chute.

In the event that the vegetable is presented to the first conveyer with its longer diameter perpendicular or so related to the plane of the first conveyer that the vegetable falls through the first conveyer without any grading action due to the first conveyer, the vegetable is diverted and upset as before but in the last named condition the vegetable is presented to the second conveyer so as to fall thereon with its longer diameter parallel to the plane of the second conveyer and the second conveyer performs the grading in the same manner as the grading would have been brought about by the first conveyer had the vegetable been properly presented thereto.

While the structure has been described as a fruit and vegetable grader, the salient features of the invention are susceptible of use for grading other articles having diameters of different lengths at or about right angles to each other and especially articles which are of generally ovoid configuration.

In the structure illustrated in the drawings, the sprocket chains are shown as constituting the article carrying members of the conveyers but it will be observed that any means whether constructed of chain or not may be employed so long as provision is made for sustaining the articles at supported points spaced apart a distance greater than the smaller diameter of the articles, but less than the longer diameter thereof.

What is claimed is:

1. In a grading machine for articles, substantialy identical conveyers arranged at different heights and in lateral displaced relation one to the other, and laterally diverting and upsetting means between the higher and lower conveyers and located to direct articles falling through the higher conveyer on to the diverting means and from the latter to the lower conveyer.

2. In a grading machine, higher and lower grading means in lateral displaced relation, with means intermediate of the higher and lower grading means for receiving articles from the higher grading means and diverting the articles to the lower grading means and at the same time upsetting said articles.

3. In a grading machine, higher and lower progressively acting grading means and means located between the higher and lower grading means for receiving articles falling from the higher grading means and diverting them to the lower grading means and at the same time upsetting the articles with respect to the position of the articles as received upon said means located between the grading means.

4. A machine for grading articles each having diameters of different lengths, comprising two substantially identical grading conveyers located at different heights one with relation to the other and with one conveyer displaced laterally with respect to the other, and diverting and upsetting means for the articles located below the higher conveyer and above the lower conveyer whereby an article dropping from the higher conveyer and striking the upsetting means in the line of one of its diameters is directed to the second conveyer in the line of another of its diameters differing in length from that of the first named diameter.

5. In a grading machine, an upper conveyer and a lower conveyer located at different heights and in laterally displaced relation one to the other, and means located between the upper and lower conveyers and in vertical alinement with the upper conveyer for diverting and upsetting the articles dropped from the upper conveyer and causing their deposition on the lower conveyer in a different relation from that assumed on the upper conveyer.

In testimony that I claim the foregoing as my own, I have hereto affixed my signature in the presence of two witnesses.

HARVEY JOHN GEHR.

Witnesses:
RAY E. FRIEDLY,
JOHN A. POTTER.